United States Patent [19]

Gill

[11] Patent Number: 4,905,902

[45] Date of Patent: Mar. 6, 1990

[54] SPRAYING EQUIPMENT

[75] Inventor: David C. Gill, Bristol, United Kingdom

[73] Assignee: Nomix Manufacturing Company Limited, Bristol, United Kingdom

[21] Appl. No.: 108,909

[22] Filed: Oct. 15, 1987

Related U.S. Application Data

[63] Continuation of Ser. No. 78,041, Jul. 27, 1987, Pat. No. 4,790,483, which is a continuation-in-part of Ser. No. 555,958, Nov. 29, 1983, Pat. No. 4,609,148.

[30] Foreign Application Priority Data

Nov. 30, 1982 [GB] United Kingdom ............... 8234125
Feb. 12, 1983 [GB] United Kingdom ............... 8305003
Aug. 11, 1983 [GB] United Kingdom ............... 8320678

[51] Int. Cl.$^4$ ............................................. B05B 3/10
[52] U.S. Cl. .................................................. 239/224
[58] Field of Search ............. 239/223, 224, 700, 701, 239/702, 703, 394

[56] References Cited

U.S. PATENT DOCUMENTS

| | | | |
|---|---|---|---|
| 442,865 | 12/1890 | DeKinder | 239/224 |
| 2,531,650 | 11/1950 | Stagner | 239/375 |
| 2,552,445 | 5/1951 | Nielsen . | |
| 2,572,950 | 10/1951 | Rider . | |
| 2,888,206 | 5/1959 | Waldrum . | |
| 3,073,531 | 1/1963 | Kothe . | |
| 3,085,749 | 4/1963 | Schweitzer et al. . | |
| 3,204,836 | 9/1965 | Joffe . | |
| 3,343,795 | 9/1967 | Pinke . | |
| 3,346,192 | 10/1967 | Hege . | |
| 3,452,931 | 7/1969 | Knowles . | |
| 3,455,507 | 7/1969 | Ryder et al. . | |
| 3,459,586 | 6/1969 | Kiwiet et al. . | |
| 4,183,499 | 1/1980 | Swartz et al. . | |
| 4,225,084 | 9/1980 | Bals . | |
| 4,360,155 | 11/1982 | Hubbell et al. . | |
| 4,362,275 | 12/1982 | Coffee . | |
| 4,407,217 | 10/1983 | Jackson . | |
| 4,544,130 | 10/1985 | Stoll et al. . | |
| 4,609,148 | 9/1986 | Gill . | |
| 4,690,326 | 9/1987 | Gill . | |

FOREIGN PATENT DOCUMENTS

| | | |
|---|---|---|
| 470835 | 12/1972 | Australia . |
| 467276 | 6/1973 | Australia . |
| 0041008 | 12/1981 | European Pat. Off. . |
| 0110713 | 6/1984 | European Pat. Off. . |
| 143588 | 6/1985 | European Pat. Off. . |
| 1948980 | 4/1971 | Fed. Rep. of Germany . |
| 2559144 | 6/1977 | Fed. Rep. of Germany . |
| 2351709 | 1/1978 | France . |
| 23673 | 3/1978 | France . |
| 285699 | 2/1965 | Netherlands . |
| 1199703 | 12/1985 | U.S.S.R. ............................... 239/223 |
| 1046065 | 10/1919 | United Kingdom . |
| 345714 | 1/1930 | United Kingdom . |
| 862742 | 3/1961 | United Kingdom . |
| 901969 | 7/1962 | United Kingdom . |
| 991973 | 5/1965 | United Kingdom . |
| 1340097 | 12/1973 | United Kingdom . |
| 1340432 | 12/1973 | United Kingdom . |
| 134337 | 1/1974 | United Kingdom . |

(List continued on next page.)

Primary Examiner—Andres Kashnikow
Assistant Examiner—Christopher G. Trainor
Attorney, Agent, or Firm—Merchant, Gould, Smith, Edell, Welter, & Schmidt

[57] ABSTRACT

Equipment for spraying a fluid such as a herbicide comprises a support tube on which is mounted a head comprising a body and a rotatable disc. Electrical supply loads and a supply hose for fluid pass to the head through the support tube. The head and the body define between them a narrow annular gap. Fluid is supplied to the disc at a position radially inwards of the gap and flows through the gap to be discharged as fine droplets from the periphery of the disc. The width of the gap is such that the fluid passing through it is wiped circumferentially so that it is distributed around the disc. This promotes an even spray of fluid from all parts of the periphery of the disc. Special shapes for the disc are proposed in order to promote the formation of small droplets of uniform size.

3 Claims, 5 Drawing Sheets

FOREIGN PATENT DOCUMENTS

| | | |
|---|---|---|
| 1388270 | 3/1975 | United Kingdom . |
| 1460132 | 12/1976 | United Kingdom . |
| 1515511 | 6/1978 | United Kingdom . |
| 2008439 | 6/1979 | United Kingdom . |
| 1549789 | 8/1979 | United Kingdom . |
| 2026904 | 2/1980 | United Kingdom . |
| 2043489 | 10/1980 | United Kingdom . |
| 2075639 | 11/1981 | United Kingdom . |
| 2099724 | 12/1982 | United Kingdom . |
| 2131327 | 6/1984 | United Kingdom . |
| 2136321 | 9/1984 | United Kingdom . |
| 2144347 | 3/1985 | United Kingdom . |
| 2155816 | 10/1985 | United Kingdom . |

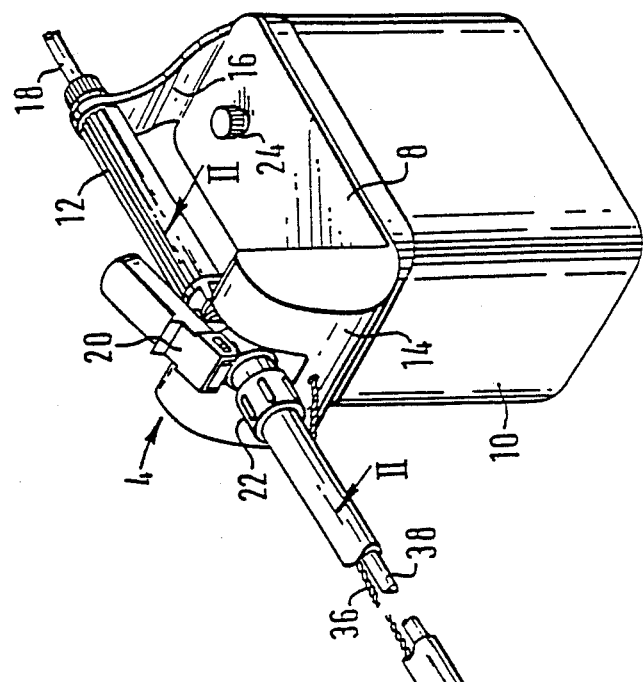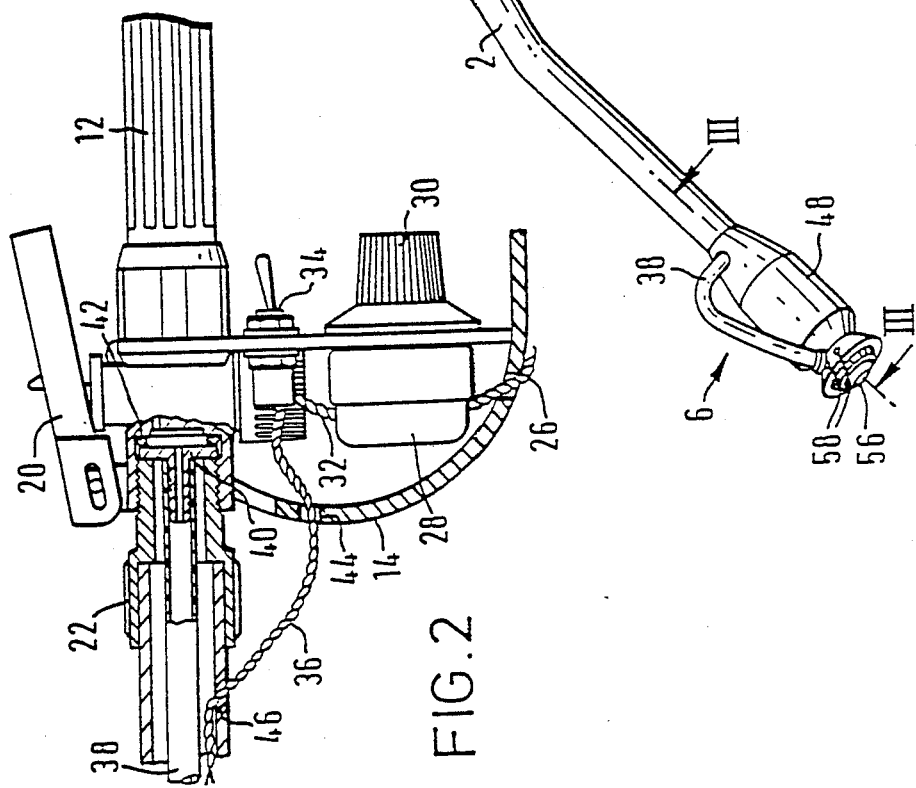

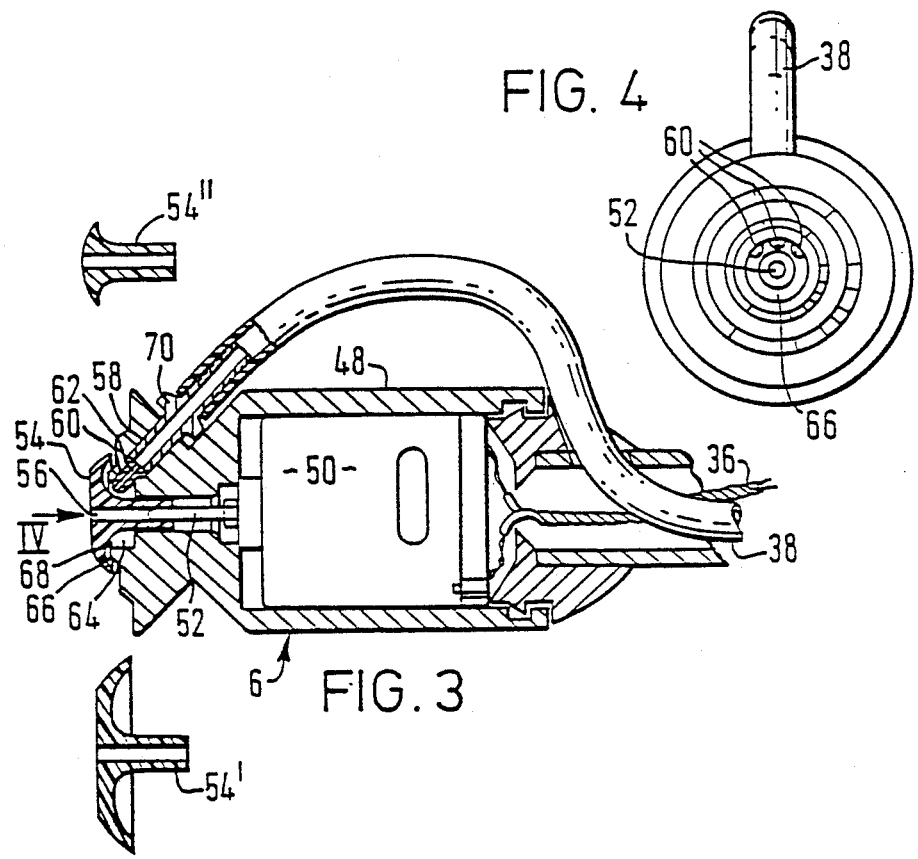
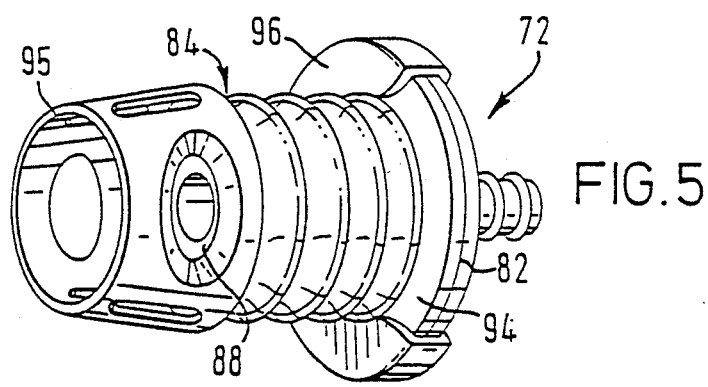

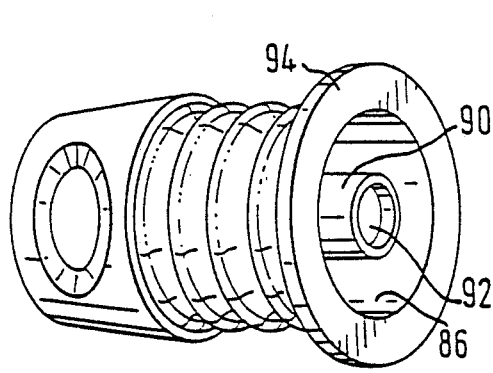
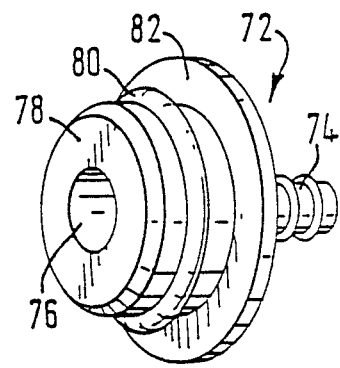
FIG.6  FIG.7
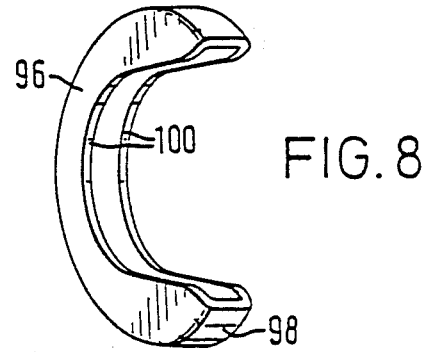
FIG.8
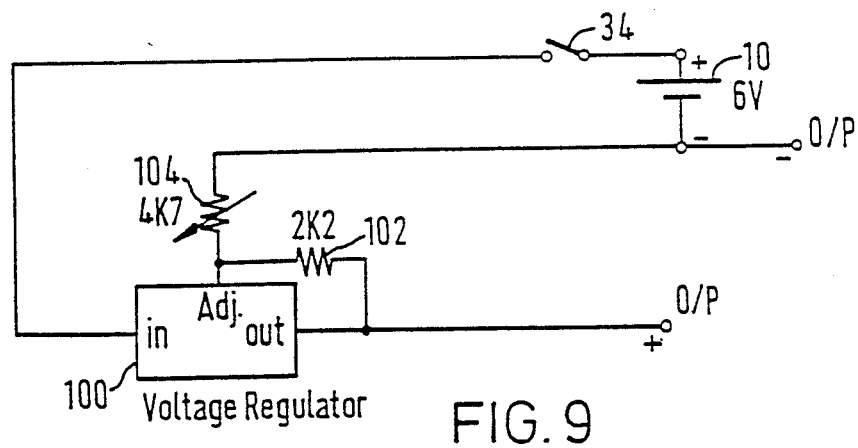
FIG.9

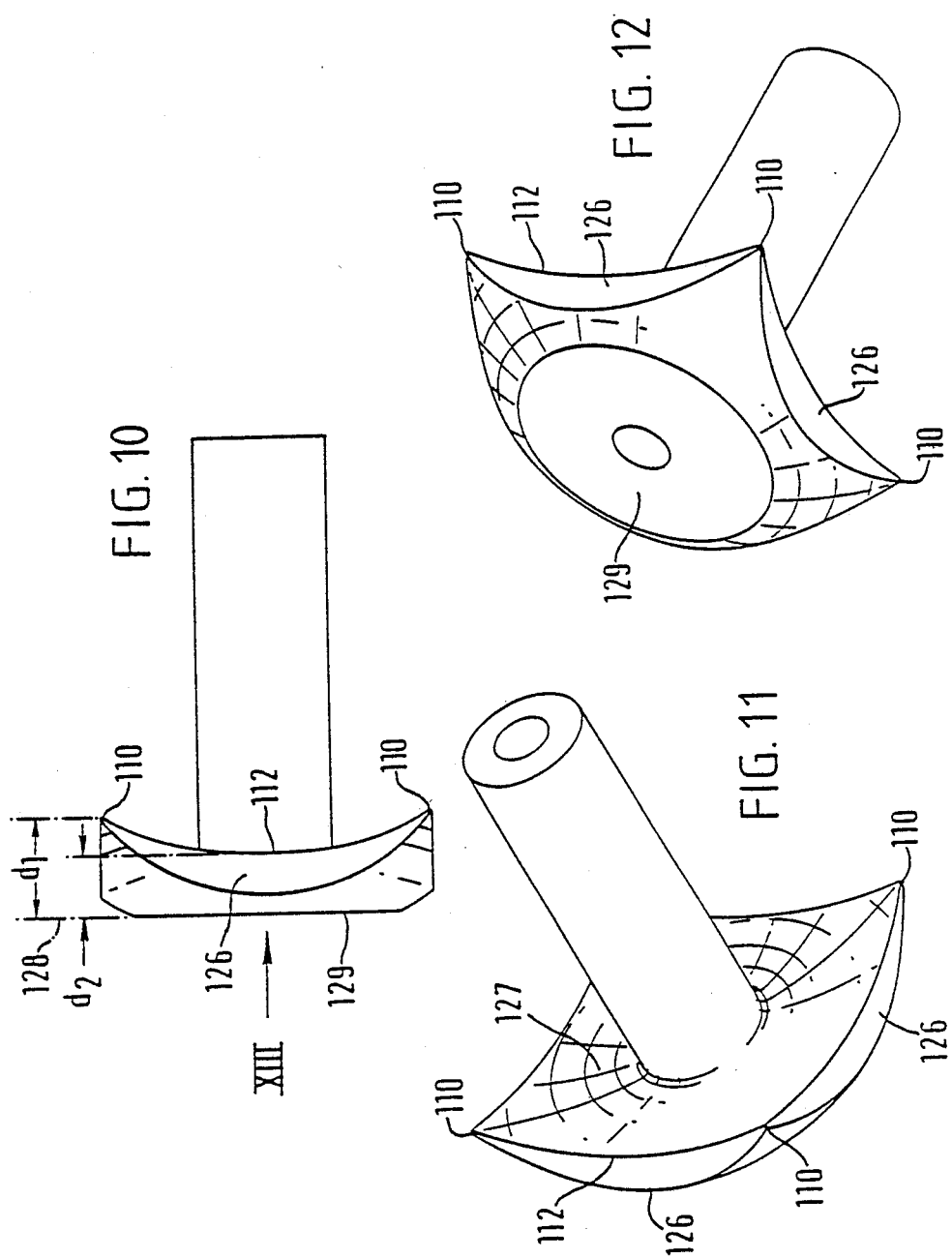

4,905,902

SPRAYING EQUIPMENT

This is a continuation of U.S. application Ser. No. 078,041, filed 27 July 1987, now U.S. Pat. No. 4,790,483, which is a continuation-in-part of U.S. application Ser. No. 555,958, filed 29 Nov. 1983, now U.S. Pat. No. 4,609,148.

TECHNICAL FIELD

This invention relates to spraying equipment and particularly, although not exclusively, to equipment for spraying herbicides.

BACKGROUND AND PRIOR ART

It is becoming increasingly common for herbicides to be applied in the form of oil-based emulsions. Such herbicides are highly efficient and very small quantities, if properly applied, can be used to treat large areas. However, to be effective, the herbicides must be applied in the form of droplets of uniform size and distribution. The nature of the herbicide, which is commonly a viscous liquid having a viscosity, for example, of 20-40 centistokes, has made it difficult for this requirement to be met.

In known proposals for promoting the creation of fine droplets of uniform size, the fluid is supplied to a rapidly rotating disc from which the fluid is ejected by centrifugal force. The face of the atomising disc over which the fluid flows is formed with radial grooves terminating in radially extending points. Examples of such proposals can be found in British Patent Specifications Nos. 1515511 and 2008439. The radial grooves constitute channels along which fluid flows under the action of centrifugal force when the disc is rotated. At the radially outer ends of the grooves, the individual streams of fluid are ejected from the points and break up into fine droplets. When using such discs, however, it is not possible to control the spraying width or the droplet size to suit prevailing conditions.

SUMMARY OF THE INVENTION

According to the present invention there is provided a spraying device comprising a body and an atomising disc which is mounted on the body for rotation about a rotary axis. Drive means is provided for driving the disc in rotation. The atomizing disc has a fluid-receiving surface which is defined by an outer periphery of the disc from which fluid is discharged in operation. The outer periphery is polygonal as viewed parallel to the rotary axis of the disc, each side of the polygonal periphery being defined by the junction of the fluid receiving surface and a side surface which extends substantially parallel to the rotary axis, this junction being curved as viewed perpendicular to the rotary axis.

The drive means may comprise an electric motor and the equipment may further comprise an electrical lead connected to the motor and a liquid supply tube for supplying liquid to the atomising disc. The electrical lead and the supply tube may be accommodated within a support tube on which the body is mounted and emerge at the end of the support tube away from the body for connection to, respectively, a source of electrical power and a container of liquid to be sprayed.

In an embodiment in accordance with the invention, the support tube is mounted on a bracket which is adapted to be connected to a battery constituting the source of electrical power. The bracket also includes a handle so that the equipment can be carried and operated by hand. The bracket may be provided with a manually operated valve for controlling the supply of liquid to the spraying head and an on/off switch for controlling the supply of electrical power to the spraying head. The bracket may also be provided with an adjustable voltage regulator so that the voltage at the electric motor, and consequently the speed of rotation of the atomising disc, can be varied. This variability enables the spraying width of the equipment and the size of the droplets issuing from the atomising disc to be varied.

BRIEF DESCRIPTION OF THE DRAWINGS

FIG. 1 is a perspective view of spraying equipment;
FIG. 2 is a partly sectioned view taken along the line II—II in FIG. 1;
FIG. 3 is a partly sectioned view taken along the line III—III in FIG. 1;
FIG. 4 is a partial end view taken in the direction of the arrow IV in FIG. 3;
FIG. 5 is a perspective view of an outlet fitting for a liquid container;
FIGS. 6, 7 and 8 are perspective views of, respectively, three elements of the outlet fitting of FIG. 5;
FIG. 9 is a circuit diagram representing a voltage regulating circuit of the spraying equipment;
FIG. 10 is a side view of an atomising disc for use with the spraying head of FIG. 1;
FIG. 11 is a perspective view from the rear of the disc shown in FIG. 10;
FIG. 12 is a perspective view from the front of the disc shown in FIG. 10.

DETAILED DESCRIPTION OF PREFERRED EMBODIMENTS

Figure 13:
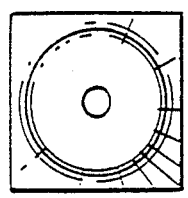
FIG. 13 is a view taken in the direction of the arrow XIII in FIG. 10.
Figure 14:
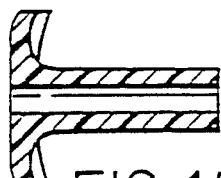
FIG. 14 is a sectional view of the disc shown in FIGS. 10 and 11.
Figure 15:
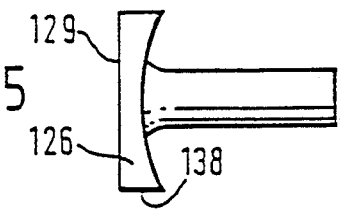
FIG. 15 is a view corresponding to FIG. 10 but showing an alternative form of disc.
Figure 16:
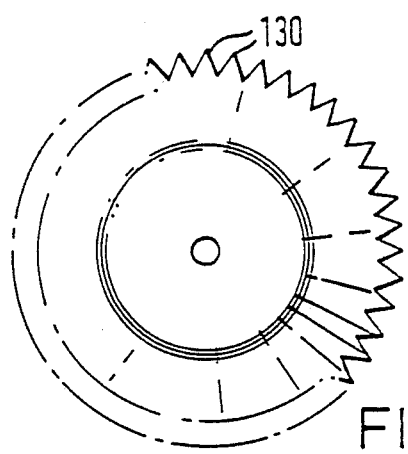
FIG. 16 is an end view of another form of atomising disc.
Figure 17:
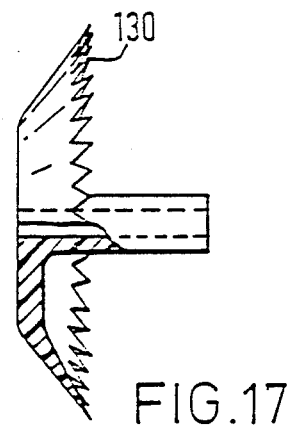
FIG. 17 is a partially sectioned side view of the disc of FIG. 16.
Figure 18:
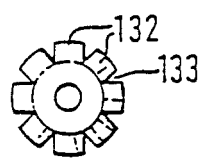
FIG. 18 is an end view of a third form of atomising disc.
Figure 19:
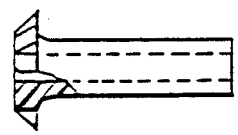
FIG. 19 is a partially sectioned side view of the disc of FIG. 18.
Figure 20:
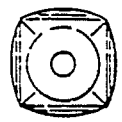
FIG. 20 is an end view of a fourth form of atomising disc.
Figure 21:
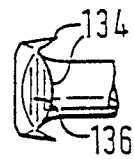
FIG. 21 is a partial side view of the disc of FIG. 20.
Figure 22:
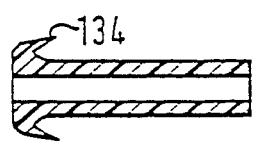
FIG. 22 is a sectional view of the disc of FIGS. 20 and 21.

Referring to FIG. 1, the spraying equipment comprises a support tube 2 which is connected at one end to a supply assembly 4 and carries at the other end a spraying head 6. The supply assembly 4 comprises a battery carrier 8 to which a battery 10 is connected and which is provided with a hollow handle 12. The handle 12 is mounted between front and rear limbs 14 and 16 of the battery carrier 8 and is connected at its rear end to a fluid supply line 18. Near its front end, the handle 12 is provided with an on/off tap 20, and at its extreme end it is connected to the support tube 2 by a fitting 22. A supply tube 38 communicates with the interior of the handle 12 and consequently with the fluid supply line 18. As can be seen from FIG. 2, the supply tube 38 is provided at its end with a flanged connector 40. An O-ring 42 is compressed between the connector 40 and a face provided on the handle 12 under the action of the fitting 22.

The battery 10 is connected to the bracket 8 by terminal nuts 24 (only one of which is visible in FIG. 1). The two terminals are connected by a lead 26 to an adjustable voltage regulator 28 controlled by a knob 30. The output of the voltage regulator 28 is connected by a short lead 32 to an on/off switch 34. The on/off switch 34 is connected by a further lead 36 to the spraying head 6.

As will be appreciated from FIGS. 1 and 2, both the lead 36 and the supply tube 38 extend down the support tube 2. The lead 36 extends through an opening 44 in the front limb 14 of the bracket 8 and through an opening 46 in the support tube 2.

As shown in FIG. 3, the spraying head 6 comprises a body 48 which accommodates an electric motor 50 having an output spindle 52. The lead 36 is connected to the input terminals of the motor 50. The output spindle 52 of the motor carries a rotary atomiser disc 54, the spindle 52 being a friction fit within a bore 56 in the disc 54.

The body 48 has three angularly spaced passages 58. Each of these passages is inclined to the axis of the motor 50 such that it extends inwardly and towards the atomising disc 54. At the inner end of each passage 58 there is a jet 60 having a restrictor passage 62. The diameters of the restrictor passages 62 of the jets are different from one another. The restrictor passages 62 open into a cavity 64 in the end of the body 48. An annular chamber is defined between a circumferential wall of the cavity and a shank of the disc 54. the circumferential wall terminates at a lip 66 which defines, with the disc 54, an annular outlet slot 68. The slot 68 is shown greatly enlarged in FIG. 3, for the sake of clarity. The width of the slot 68 is very small compared to the corresponding dimension of the annular chamber. Thus, in the illustrated embodiment, the width of the slot 68 is very small compared with the axial dimension of the annular chamber. In practice, the disc 54 may be pushed onto the drive shaft 52 until it contacts the annular lip 66, the slot 68 then being provided as a result of axial play in the bearings of the motor 50. The width of the slot is sufficiently small to make it impossible for a stream of liquid to flow across the surface of the disc 54 without contacting the lip 66. The maximum width of the slot may, for example, be 0.1 millimeter.

The radially outer portion of each passage 58 constitutes a socket for receiving an end fitting 70 of the supply tube 38.

The end of the fluid supply line 18 away from the handle 12 is provided with a plug element 72 (FIGS. 5 and 7). The plug element 72 has a barbed connector 74 which fits into the supply line 18 and communicates with a passage 76 extending through the plug element 72. The plug element has a cylindrical portion 78 carrying an O-ring 80. There is a flange 82 at the end of the cylindrical portion nearer the connector 74.

The plug element 72 is adapted to mate with a socket element 74 (FIGS. 5 and 6). The socket element 84 would, in use, be part of a container of liquid to be dispensed by the spraying equipment. The socket element 84 comprises a cylindrical socket 86 for receiving the cylindrical portion 78 of the plug element 72. The socket 86 has an end wall 88 from which projects a hollow spigot 90 which is a close fit in the opening 76 in the plug element 72. Before first use, the through passage of the spigot 90 is closed by a breakable diaphragm 92. The interior of the spigot 90 opens into a space enclosed by an apertured skirt 94 which, in use, would be disposed within the container to which the socket element 84 is fitted. In a preferred embodiment, the container is a collapsible bag and may be supported in a rigid box, for example of cardboard, in a manner similar to that which is sometimes used for packaging wine.

Thus, to connect the supply tube 18 to the container, the diaphragm 92 is pierced and the plug element 72 is inserted into the socket 86 until the flanges 82 and 94 abut one another. To secure the plug element 72 within the socket 86, a clip element 96 (FIG. 8) is provided. This clip element has a circumferential wall 98 the ends of which subtend an angle of slightly greater than 180°. The axial edges of the circumferential wall 98 are provided with radially extending walls 100 which, when the clip element 96 is fitted to the mating plug element 72 and socket element 84, extend on opposite sides of the abutting flanges 82 and 94, as shown in FIG. 5.

FIG. 9 represents the circuitry for regulating the voltage at the motor 50. The circuitry comprises an adjustable regulator 100, a stabilizing feedback resistor 102 and a variable resistor 104, controlled by the knob 30 of FIG. 2. FIG. 9 also shows the battery 10 and the on/off switch 34. Adjustment of the variable resistor 104 alters the current input to the control terminal of the voltage regulator 100, so altering the gain between the input and the output of the voltage regulator. The stabilizing feedback resistor 102 stabilizes the output current, preventing fluctuations which might otherwise be caused, for example, by internal variations in the voltage regulator 100 or by back e.m.f.'s generated by the motor 50. The circuitry shown in FIG. 9 is capable of adjusting the output voltage between 1.25 volts and 5.4 volts, the current drain of the voltage regulator being not more than 0.003 milliamps.

In the use of the equipment, the fluid supply line 18 is connected to the container in the manner described above and the bracket 8 is connected to the battery 10 by the nuts 24. The control rocker of the tap 20 is depressed to allow liquid, such as herbicide, from the container to descend under the action of gravity through the handle 12 and the supply tube 38 to the spraying head 6, where it passes through the end fitting 70 and the restrictor passage 62 into the cavity 64. The switch 34 is turned to the "on" position which causes power to be supplied from the battery 10 to the motor 50 to spin the atomiser disc 54. The liquid flows as an annular stream through the aperture 68 and is ejected by centrifugal force from the atomising disc 54 over the entire periphery of the atomiser disc. The cooperation between the disc 54 and the body 48 provides a pumping action which promotes the flow of herbicide through the jet 60. the width of the annular gap 68 is carefully selected, in dependence of the viscosity of the liquid to be sprayed, so as to ensure than an even distribution of the liquid reaches the rotary atomiser disc to achieve all-round spraying. The lip 66 provides a wiping action over the surface of the disc 54 to spread the herbicide over the disc. Thus, even through the herbicide is admitted to the cavity 64 at a single point and the disc has a relatively small diameter, even distribution can be obtained.

By controlling the voltage applied to the motor 50 by means of the voltage regulator 28, the speed of rotation of the atomiser disc 54 can be adjusted. Such adjustment will vary not only the distance over which the liquid is ejected from the disc 54, but also the size of the droplets into which the liquid is broken up as it leaves the atomising disc 54. Thus, the higher the speed of rotation, the greater the spreading width and the smaller the droplet size. In the embodiment illustrated, the speed of rotation of the atomising disc 54 is variable between approximately 200 and 4000 rpm. The disc 54 shown fitted to the output shaft 52 has a diameter of approximately 20 mm and will, at low speed, spray the liquid over a circular area having a diameter of approximately 10 cms with a large droplet size. Increasing the speed reduces the size of the droplets but will increase the diameter of the sprayed area to approximately 60 cms.

In order to achieve both a desired droplet size and a desired spreading width, the atomizing disc 54 may be replaced by alternative discs 54' and 54'', illustrated in FIG. 3. The disc 54' has a diameter of approximately 30 mm and, at low speed, will spray over a circular area of approximately 30 cms diameter with large droplets and, at high speed, an area of approximately 1.2 meters diameter with small droplets. The smaller disc 54' has a diameter of approximately 10 mm and, at low speeds, will spray over an area of approximately 5 cms diameter with large droplets and an area of approximately 45 cms diameter with finer droplets, although the variation of droplet sizes at all spraying widths is likely to occur with the smaller disc.

The discs are a simple push fit on the output shaft 52 of the motor 50. However, in order to withdraw a disc from the output shaft 52 without damaging the periphery of the disc, a suitable tool may be provided for insertion into the passage 56. For example, the tool may comprise a screw threaded shank and the passage 56, at least at the end away from the output shaft 52, may be tapped to receive the shank.

The discs 54, 54' and 54'' are circular as viewed axially and have peripheral edges which lie in a single transverse plane.

FIGS. 10 and 22 illustrate various alternative configurations of atomising disc which have been found to give good results.

The disc shown in FIGS. 10 to 14 has a square periphery as viewed parallel to the rotary axis of the disc (FIG. 13). This shape is achieved by cutting segments from a circular disc, and consequently the periphery of the disc is defined by four flat surfaces 126 (FIG. 10). Each surface 126 has the shape of a crescent, tapering to points 110 at the corners of the disc. Alternatively, as shown in FIG. 15, the surfaces 126 could meet each other at common edges 138 which extend parallel to the rotary axis of the disc. In operation, the liquid flows as a film over the surface 127 of the disc which receives the fluid to be sprayed, and then flows from the surface 127 to the surfaces 126 at a position midway along each surface 126 (i.e. at the radially innermost part of the periphery). The fluid then migrates to the corners of the disc over the surfaces 126. The liquid is then thrown off as droplets from the points 110 or edges 138 at which the surfaces 126 meet each other. Because the inner surface 127 (i.e. that surface over which liquid flows during use of the disc) is concave, the peripheral edge 112 of the surface 127 does not lie in a single transverse plane. Instead the periphery 112 of the disc at the corners of the square is further from a notional plane 128 passing through the end face 129 of the atomising disc than are points on the periphery 112 of the disc midway between the corners. In other words, as shown in FIG. 10, the dimension $d_1$ is greater than the dimension $d_2$. The length of each side of the square may be 12 mm. Good results are achieved if the diameter of the lip 66 is also approximately 12 mm.

The disc shown in FIGS. 16 and 17 is generally circular, as viewed parallel to the rotary axis (FIG. 16), but is provided with serrations or teeth 130. The tips of the teeth 130 are further from a plane passing through the end face of the disc than are the roots of the teeth, and so again, different portions of the periphery of the disc are at different positions along the axis of the disc.

The outer diameter of the disc is 34 mm, the height of each tooth being 2.5 mm. The angular pitch of the teeth is approximately 8° , giving 45 teeth in all. The teeth may be raked in either direction, but preferably, if they are raked, they slope towards the rear, with respect to the intended direction of rotation of the disc in operation. In operation, the teeth 130 cause air to be drawn between them as the disc rotates. The flow of air promotes the formation of fine droplets of consistent size.

The disc shown in FIGS. 18 and 19 is similar to that of FIGS. 16 and 17 in that it is provided with teeth 132, but is more suitable for discs of smaller diameter, such as 10 mm. In the disc of FIGS. 18 and 19, the teeth 32 have arcuate, rather than pointed, tips separated from each other by radial notches 133.

In the embodiment of FIGS. 20 to 22, the periphery, as viewed along the axis of the disc, is again generally square, although somewhat barrelled. This configuration is achieved by bending segments of a circular disc into a more axial position, and again has the effect of positioning different portions of the periphery at different positions along the axis of the disc. The bent-back portions 134 are provided, both inside and outside, with grooves 136 which lie in planes perpendicular to the axis of the disc.

The discs illustrated in FIGS. 10 and 22 result, in operation, in fine liquid droplets of consistent size. It is believed that this effect is achieved because the shapes of the discs create turbulence in their vicinity which causes liquid being discharged from them to collide with parts of the rapidly rotating disc and so to be broken into fine droplets.

Adjustment of the flow rate of liquid to the cavity 64 and thus from the disc 54 may be achieved by inserting the fitting 70 into the appropriate socket 58, since the flow rate will be controlled by the diameter of the restrictor passage 62 in the jet 60. These passages may, for example, range from 0.75 mm to 2 mm.

The spraying equipment described with reference to the drawings provides simple adjustment of spraying width and droplet size to meet the requirements of different circumstances. For example, in windy conditions, it is desirable to have a large droplet size in order to avoid wind drift.

The use of the connector described with reference to FIGS. 5 to 8 provides a convenient method of connecting the spraying equipment to containers of ready-to-use weed killing chemicals, i.e. chemicals which require no mixing by the operator. The connector enables the spraying equipment to be "plugged in" directly to the container in which the chemical is supplied, thus avoiding any handling of the chemical by the operator.

Although the present invention has been described with reference to the spraying of herbicides, it is also suitable for other spraying operations, such as the spraying of lubricants or coating compositions such as varnish.

I claim:

1. A spraying device comprising:
    a body;
    an atomising disc mounted on the body for rotation about a rotary axis;
    drive means for driving the disc in rotation;
    the atomizing disc having a fluid receiving surface which is defined by an outer periphery of the disc from which fluid is discharged in operation, the outer periphery being polygonal as viewed parallel to the rotary axis of the disc, each side of the polygonal periphery being defined by the junction of the fluid receiving surface and a side surface which extends substantially parallel to the rotary axis, this junction being curved as viewed perpendicular to the rotary axis.

2. A spraying device as claimed in claim 1, in which each side surface is crescent-shaped, tapering to points at the corners of the polygonal periphery.

3. A spraying device as claimed in claim 1, in which each side surface meets the adjacent side surfaces at common edges which extend parallel to the rotary axis.

* * * * *